US006572677B2

(12) United States Patent
Lobo et al.

(10) Patent No.: US 6,572,677 B2
(45) Date of Patent: Jun. 3, 2003

(54) GELATIN ENCAPSULATED METAL POWDER FOR SILVER RECOVERY FROM PROCESSING SOLUTIONS

(75) Inventors: Lloyd A. Lobo, Webster, NY (US); Kevin M. Donovan, Bergen, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/829,685

(22) Filed: Apr. 10, 2001

(65) Prior Publication Data

US 2003/0024353 A1 Feb. 6, 2003

(51) Int. Cl.[7] .............................................. C22B 11/06
(52) U.S. Cl. ........................ 75/713; 266/101; 266/170
(58) Field of Search .............................. 266/101, 170; 430/399; 75/710, 713

(56) References Cited

U.S. PATENT DOCUMENTS

| 2,194,056 | A | | 3/1940 | Quaglia |
| 2,214,765 | A | * | 9/1940 | Holzwarth .................... 75/109 |
| 3,705,716 | A | | 12/1972 | Hendrickson |
| 4,065,313 | A | | 12/1977 | Shippey |
| 5,188,662 | A | | 2/1993 | McGuckin et al. |
| 5,210,009 | A | * | 5/1993 | McGuckin et al. ......... 430/399 |
| 5,310,629 | A | | 5/1994 | McGuckin et al. |

FOREIGN PATENT DOCUMENTS

| EP | 0 027 769 A1 | 4/1981 |

OTHER PUBLICATIONS

Japanese Patent Abstract 01–050047 A2 Feb. 1989.

* cited by examiner

*Primary Examiner*—Scott Kastler
(74) *Attorney, Agent, or Firm*—Chris P. Konkol

(57) ABSTRACT

The present invention relates to the use of fine metal particles for the recovery of silver from a silver-bearing photographic waste solution. In particular, the metal particles are encapsulated in a hydrophilic colloid that allows for the permeability of water and silver ions. When contacted with the silver-bearing photographic waste solution, the hydrophilic colloid will imbibe water and swell. At the same time, the silver ions can permeate the colloid matrix and come into contact with the metal particles, preferably iron particles, at which point a metal—metal exchange reaction takes place.

9 Claims, No Drawings

GELATIN ENCAPSULATED METAL POWDER FOR SILVER RECOVERY FROM PROCESSING SOLUTIONS

BACKGROUND OF THE INVENTION

This invention relates to the recovery of silver from waste photographic solutions. Although typically most of the silver removed from silver-halide imaging elements occurs in the fixing step, leaching out during the fix step, some quantity of silver is also removed in the preceding steps, such as the developer and bleach steps. There are three principle means that are used for silver recovery: (1) chemical precipitating agents, (2) electrolysis and (3) the use of a galvanic cell or metal—metal exchange. This invention relates to a method employing metal—metal exchange.

Recovery of silver ions from solution can occur when the silver ions come into contact with a metal having a higher electropositive oxidation potential than silver. The reaction proceeds as follows:

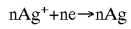

where n is the valence of the metal (Me) that has a higher electropositive potential than the $Ag^+$ ion.

Metals that fall into this category include Al, Fe, Zn. In most commercial recovery schemes, iron is the metal of choice, for health, safety, and environmental reasons and also for economic reasons. Typically, steel wool or chopped up steel wool is used in a canister. The silver-bearing waste solutions are contacted either in a batch mode or a continuous mode.

Several patents disclose methods and apparatus for recovering silver by the metal—metal exchange reaction. For example, U.S. Pat. Nos. 2,194,056; 3,705,716 and 4,065,313 disclose methods and apparatus for recovering silver from waste photographic processing solutions by an exchange reaction with a metal, such as iron or copper, that is more electropositive than silver. European publication EP27769 discloses a method of monitoring the redox potential of the silver-bearing solution while the metal—metal exchange reaction is taking place. This is done to minimize the re-dissolution of silver when the ferrous ions are oxidized to $Fe^{3+}$ ions.

U.S. Pat. Nos. 5,188,662, and 5,310,629 disclose substrates coated with a hydrophilic colloid containing physical development nuclei to remove soluble silver from developer solutions during the development step, in order to maintain the performance of the developer solution. Useful hydrophilic colloids include proteins, gelatin, and polysaccharides such as dextrin, to name a few. In U.S. Pat. No. 5,188,662, the development nuclei are noble metals that are less electropositive. In U.S. Pat. No. 5,310,629, the development nuclei also include sulfides of metals. While this technology is also capable of use to recover silver from waste photoprocessing solutions, noble metals are substantially more expensive than the electropositive metals listed above. Sulfides of metals are, in general, undesirable because of the possibility of developing an odor due to generation of hydrogen sulfide. Also, since the object of the aforementioned patents is to remove silver from functioning developing solutions, one would not want to use electropositive metals, which could ionize in the developer solution and change its functionality. Japanese patent application 01-050047 discloses a cleaning film that comprises a substrate coated with a hydrophilic colloid (like gelatin) containing a hydrophobic organic compound that is capable of adsorbing silver on the substrate. This film is also used to remove soluble silver from functioning developer solutions.

In view of the above, the prior art that discloses the removal of silver ion from solution in the presence of a hydrophilic colloid either use a crystallization phenomenon or simple physical adsorption, which methods are less effective and more expensive than the metal—metal exchange reaction.

In a typical photoprocessing operation, silver-bearing waste from the operation is passed through a cartridge containing an electropositive metal. For example, steel wool in a canister is known for this purpose.

PROBLEM TO BE SOLVED BY THE INVENTION

It is highly preferred that the hydrophilic binder used in the present invention be crosslinked to some degree, to prevent disintegration/dissolution of the binder when it comes into contact with an aqueous solution. For example when polyvinyl alcohol is used as the hydrophilic colloid, it can be crosslinked with sodium borate (Borax). In the case of the preferred hydrophilic colloid, gelatin, several types of crosslinkers or hardeners are known in the art. These are described in "The Theory of the Photographic Process" 4th Ed., Ed. T. H. James, pg. 77–87, 1977. The class of inorganic crosslinkers includes salts of chromium and some salts of aluminum. These typically crosslink via the free carboxylic acids in gelatin, and the degree of crosslinking is pH sensitive and also reversible. It may not be desirable, however, to use these salts for absorbents because of the impact these materials have on the environment. Organic crosslinkers are, therefore, preferred. The organic crosslinkers act via the ε-amino function of lysine and hydroxylysine. There are, on the average, about 0.35–0.4 mmol of lysine per gram of dry gelatin and about 20% of that amount of hydroxylysine per gram of dry gelatin. Classes of organic crosslinkers include, but are not limited to, aldehydes and blocked aldehydes, ketones, carboxylic and carbamic acid derivatives, sulfonate esters and sulfonyl halides, s-triazines, epoxides, aziridines, isocyanates, carbodiimides and isoxazolium salts. Polymeric crosslinkers are generic polymer molecules bearing one or more of the above moieties in their chain. The selection of the crosslinker type depends on the efficacy of the crosslinking, its toxicity in the native state, the residuals in the absorbent, and cost.

SUMMARY OF THE INVENTION

It has been found that the problems encountered using fine metal particles for the recovery of silver from a silver-bearing photographic waste solution can be alleviated by encapsulating or embedding metal particles in a matrix of a hydrophilic colloid that allows for the permeability of water and silver ions. When contacted with the silver-bearing photographic waste solution, the hydrophilic colloid will imbibe water and swell. At the same time, the silver ions can permeate the colloidal matrix and come into contact with the metal particles, preferably iron particles, at which point a metal—metal exchange reaction takes place to reduce the silver ion to silver metal.

By embedding, dispersing, or encapsulating the metal particles within a hydrophilic colloid, the reduced silver is precipitated within a colloidal matrix, whereby the hydrophilic colloid also functions as a filter. The hydrophilic colloid/metal combination can take various physical forms or shapes, such as, for example, a coating or coated film, a coated substrate, granules, a block of variable shape, or a flow-through filter. The recovery element may be attached/affixed to a surface or other object or remain unattached. If used in a filter, the filter may be of any conventional design. See, for example, U.S. Pat. No. 5,310,629, hereby incorporated by reference.

The advantages of the present invention over other methods of recovering silver include the fact that, since it involves metal—metal exchange, it allows the use of a metal with a high specific surface area, but without the problems associated with handling of powders as well as the oxidation of such powders over time. It also obviates the need for a filter to separate the silver from the solution. Finally, it increases the ease of handling the recovered silver, i.e., one can deal with granules or coatings (containing relatively little or no liquid) rather than slurries containing finely divided silver and oxidation products of the metals themselves. Another advantage is that, by encapsulating the fine metal particles within the hydrophilic colloid, it was surprisingly found that the amount of metal needed to maintain the same reaction kinetics is much less than that needed when the metal is in the form of chopped or shredded wool, as currently used in the trade.

DETAILED DESCRIPTION OF THE INVENTION

As indicated above, the present invention involves the recovery of silver from a silver-bearing photographic waste solution by encapsulating or embedding fine metal particles in a matrix made from a hydrophilic colloid, which hydrophilic colloid that allows the permeability of water and silver ions. When the silver ions in the waste solution permeates the colloidal matrix and comes into contact with the metal particles, a metal—metal exchange reaction takes place in which the silver ions are reduced to silver metal.

The following criteria normally apply to the hydrophilic colloid. First, the metal particles should be easily dispersed in a solution of the colloid and should remain dispersed as the colloid is dried. That is, the colloid should not cause the particles to flocculate or clump. Second, the hydrophilic colloid should not dissolve in the aqueous waste solution it is used to treat, as a function of time of use. Otherwise the metal particles or the exchanged silver will be released into solution. Third, the hydrophilic colloid must swell with the solvent (water) and be permeable to the silver and metal ions. The metal is oxidized to metal ions, which will diffuse out of the binder matrix.

By dispersing metal particles within a hydrophilic colloid, the reduced silver is precipitated within the hydrophilic colloid matrix, allowing the hydrophilic colloid to effectively function as, or effectively replace and obviate the need for, a filter. The hydrophilic colloid/metal combination can take several physical forms, such as a coated film, or granules, coated substrate, flow-through filter, and the like. Various conventional forms for a silver recovery element are disclosed in the prior art, mentioned above. In a preferred embodiment, chopped or shredded steel wool is packed into a hollow canister at the exit of which is a filter. Silver containing waste solutions are sent through the canister. Reduced silver particles are trapped by the filter. In order to reduce the silver concentration in the waste to desired levels, the solutions may be passed through more than one canister, sequentially.

The metals used to recover silver must have a higher electropositive oxidation potential than silver. Examples of such metals are tin, copper, lead, nickel, cadmium, zinc, aluminum, and iron. For cost and health reasons, the more preferable metals are aluminum, zinc and iron. Aluminum, however, is less than ideal because it may become passivated due to the formation of a surface layer of aluminum oxide. Iron is the most preferable among all the metals.

The particle size of the metal can vary. If the size is too large, however, it is difficult to disperse or encapsulate and, because the specific surface area is small, the reaction kinetics may be slower. Thus, it is preferred that the particles size is smaller than 1 mm. On the other hand, if the size is too small, the particles may tend to be more reactive than optimal and, as a result, may become passivated or present an explosion hazard during preparation. It is preferred, therefore, that the particles are greater than 5 $\mu$m in average diameter. The more preferred average particle size (diameter) is between 30 $\mu$m and 500 $\mu$m. The most preferred particle size is between 30 $\mu$m and 100 $\mu$m.

The hydrophilic colloids that can be used in this invention can also be referred to as binders, since they must not disintegrate or dissolve upon contact with a water-based solution, including the waste solution to be treated. Hydrophilic colloid binders include, but are not limited to, water soluble polymers such as gelatin, gelatin derivatives, maleic acid anhydride copolymers, cellulose compounds (such as carboxymethyl cellulose, hydroxyethyl cellulose, cellulose acetate butyrate, diacetyl cellulose or triacetyl cellulose), synthetic hydrophilic polymers (such as polyvinyl alcohol, poly-N-vinylpyrrolidone, acrylic acid copolymers, polyacrylamides, partially hydrolyzed acetate and polyacrylate acid esters), and derivatives, copolymers, mixtures or blends of all of the above polymers, and the like.

Gelatin is the most preferred binder. For example, gelatin for use in the present invention may be obtained by alkali treatment of collagen, by immersing the latter in an alkali bath. It may be obtained from acid treatment of collagen, where the collagen is immersed in an acid bath prior to extraction. It may be obtained by collagen treated in both baths and, finally, it may be obtained by enzyme treatment. The main differences in these gelatins is in their isoelectric point (i.e.p.), which is the pH at which the gelatin molecule has no net charge, due to the balance of the positive and negative charges. Acid processed gelatin has an i.e.p. from 7–9.0, whereas alkali processed gelatin has an i.e.p. at about 5.0. The sources of collagen used to make the gelatin can vary. Typical sources are bovine ossein, hide, pig skin and poultry ossein. Depending on the amount of hydrolysis, the mean molecular weight of the gelatin can vary. Gelatin derivatives can also be used. These include gelatins derivatized with aromatic sulfonyl chlorides, carboxylic acid chlorides, carboxylic acid anhydrides, aryl isocyanates, 1,4-diketones, etc. Depending on the groups that are added to the gelatin, the i.e.p. of the resultant gelatin, can be above or below that of the parent gelatin material.

It is highly preferred that the hydrophilic binder used in the present invention be crosslinked to some degree, to prevent disintegration/dissolution of the binder when it comes into contact with an aqueous solution. For example when polyvinyl alcohol is used as the hydrophilic colloid, it can be crosslinked with sodium borate (Borax). In the case of the preferred hydrophilic colloid, gelatin, several types of crosslinkers or hardeners are known in the art. These are described in "The Theory of the Photographic Process" $4^{th}$ Ed., Ed. T. H. James, pg. 77–87, 1977, hereby incorporated by reference. The class of inorganic crosslinkers includes salts of chromium and some salts of aluminum. These typically crosslink via the free carboxylic acids in gelatin, and the degree of crosslinking is pH sensitive and also reversible. It may not be desirable, however, to use these salts for absorbents because of the impact these materials have on the environment. Organic crosslinkers are, therefore, preferred. The organic crosslinkers act via the ε-amino function of lysine and hydroxylysine. There are, on the average, about 0.35–0.4 mmol of lysine per gram of dry gelatin and about 20% of that amount of hydroxylysine per gram of dry gelatin. Classes of organic crosslinkers include, but are not limited to, aldehydes and blocked aldehydes, ketones, carboxylic and carbamic acid derivatives, sulfonate esters and sulfonyl halides, s-triazines, epoxides, aziridines, isocyanates, carbodiimides and isoxazolium salts. Polymeric crosslinkers are generic polymer molecules bearing one or more of the above moieties in their chain. The selection of the crosslinker type depends on the efficacy of the crosslinking, its toxicity in the native state, the residuals in the absorbent, and cost.

The amount of crosslinker used may depend on the degree of stability (against dissolution of the binder) that is desired. For purposes of this invention, we define the "effective mole" of crosslinker as the moles (number of molecules divided by the Avogadro Number) of all species that can react with two ε-amine sites in gelatin. Thus, for a simple crosslinker like formaldehyde, the effective moles is equal to the actual moles, whereas for a polymeric crosslinker the effective moles is calculated based on the total moles of the monomers that act as crosslinkers. Typically, it is found that in order for the gelatin to be stable in temperatures up to 50° C., it is preferably that the amount of crosslinker should be greater than 10 μmole/gm gelatin. However, in addition to preventing dissolution of gelatin, the crosslinker can also minimize the swell of the gelatin with the silver bearing aqueous solution. The swell of the gelatin is defined as the increase in weight of the gelatin granule, due to imbibation of the solvent (water) into the gelatin matrix. The higher the amount of crosslinker, usually the less is the ability to swell. In many silver recovery applications, it may be undesirable to recover the silver along with a lot of water, because of the energy subsequently required to recover the silver. Thus, in order to keep the swell to a minimum or optimal amount, the amount of crosslinker can be as high as, for example, 350 μmole/gm of gelatin. At crosslinker levels higher than that, the decrease in swell with increasing crosslinker is small and may not be worth the cost of the extra crosslinker. The preferred range of crosslinker for gelatin bearing systems is from 50 to 250 μmole/gm of gelatin.

The amount of metal with respect to the amount of hydrophilic colloid can be optimized for the cost of the material and the performance. If the volume ratio of iron to hydrophilic colloid is too low, then the amount of hydrophilic colloid that is needed becomes prohibitively expensive. Furthermore, due to the swelling of the hydrophilic colloid, the amount of liquid imbibed per gram of silver recovered becomes high. If the metal to hydrophilic colloid volume ratio is too high, then some of the metal may be exposed at the surface of the hydrophilic colloid. In that case the silver will be precipitated outside the hydrophilic colloid matrix and the efficacy of the silver filter is reduced. It is found that preferably the volume of the total body of functional material (i.e., combined metal and hydrophilic colloid matrix) occupied by the metal is in the range of from 5% to 35%. The most preferred range is from 10% to 30%.

The silver-recovery element comprising the hydrophilic-colloid matrix/metal functional material can be in several forms. For example. it can be in the form of granules of hydrophilic colloid, having embedded in it metal particles. The functional material can also be coated onto an inert substrate or a substrate having a different function, wherein the coated substrate is contacted with the photoprocessing solution.

In one embodiment, substantially all of the metal particles furthest from the surface of the matrix are not further than 10 mm. Preferably, not more than 1% (by weight), more preferably none, of the particles should be further than 10 mm. If this distance is greater than 5 mm, then the kinetics of diffusion, with respect to the silver and metal ions, tends to slow down, and the use of the metal is not as efficient. If in the form of granules, we have found that, in order for the metal to be used most efficiently, preferably more than 90% of the granules should be able to pass through a screen with a 10 mm opening.

As indicated above, the hydrophilic colloid/metal material can also be coated on a substrate. Any type of substrate can be used, provided the substrate has adequate dimensional stability when contacted with the processing solution. Plastic supports are preferred. Examples of these are cellulose derivatives including cellulose diacetate, cellulose triacetate and the like; polyamides; polycarbonates; polyesters, particularly polyethylene terephthalate and polyethylene naphthalate; polystyrene, polypropylene, polyethylene, polysulfone, polyarylates, polyether imides, and the like. Paper based supports can also be used, particularly resin-coated papers used in photographic and printing industry. Supports for photographic elements are described in Research Disclosure, December 1989, Item 308,119 published by Kenneth Mason Publications, Ltd., Dudley Annex, 12a North Street, Emsworth, Hampshire P010 7DQ England, section XVII.

To make the silver recovery element in which the functional material is coated on a substrate, one way is to apply a solution of the hydrophilic colloid and iron to a support by a standard coating technique such as slide coating, bar coating, roll coating, knife coating, curtain coating, rotogravure coating, spraying, and dipping. In order to increase the efficiency of recovery, a high level of hydrophilic colloid and metal per unit area should be laid down. In order to alleviate the problems associated with curl for such high laydowns of hydrophilic colloid, it is preferred that both sides of the support be coated with hydrophilic colloid and iron. The amount of hydrophilic colloid desired is from 1000 $mg/ft^2$ to 10,000 $mg/ft^2$ on each side of the support. In accordance with the preferred amount of metal in the material, the amount of metal to be laid down is from 5 to 35% of the volume of the material (hydrophilic colloid plus metal) laid down. In addition, the hydrophilic-colloid/metal coating may optionally have an overcoat with gelatin or another hydrophilic binder, with no metal being present in the overcoat. This may be done, for example, to ensure that the recovered silver is embedded within the coating and not on the surface of the coating.

When carrying out the process of the invention, the step of contacting the waste solution with the silver recovery element should be for a time sufficient to reduce the concentration of silver in the waste solution to a desired level. The desired final silver concentration and treatment time are readily determinable, and can be influenced by factors such as solution flow rate, contact time, starting silver concentration, and the design and efficiency of the recovery element, as can be preselected by the skilled artisan. In one embodiment, the treatment time to reduce silver concentration from about 5000 mg/liter to about 5 mg/liter is about 10 hours. Suitably, in one embodiment, the process can be carried out at a temperature in the range of from about 20°

C. to about 50° C. The process can be conducted at any pressure in the range of from about atmospheric pressure for a stated set of reaction conditions to about 100 atmospheres. In one embodiment, a recovery element can comprise a canister containing the granules described above that is positioned before the drain for the waste solution which allows waste solution to flow from the photoprocessor, contact the granules for a sufficient time, so as to reduce the silver ion concentration, and subsequently exit the canister substantially silver free. When the granules have been consumed of the metal, they can be sent to a refiner to recover the precious metal. In another embodiment, the recovery element can be snuggly positioned in a silver recovery canister comprising a housing and having ports for the respective intake of waste solution and the discharge of treated waste solution. Optionally, a recirculation system containing a silver recovery element of the invention, developer solution can allow partial bypass of the silver recovery element. The canisters can contain either of the two preferred embodiments of the silver recovery materials of this invention.

Alternately, waste solution can be taken from miniprocessor or a kiosk type photoprocessor, where there is no access to drains. The solution is collected in a container, till the photoprocessor is serviced and the waste solution is hauled away or dumped. The invention in the form of granules can be contained in a bag of a coarse knit fabric, to allow easy transport of solution to the granules. Alternately, the a coating described above can be placed in the container. The silver ions in the solution is continuously reduced till the time of servicing. At the service time the granules or the coating can be removed, optionally dried, and sent to the photofinisher for recovery and provided to a tank containing the recovery element by means of a pump. An optional flow control valve may be employed.

In a preferred embodiment, the silver recovery element according to the present invention is used in a stand-alone unmanned photochemical processor. Such stand-alone photochemical processors are disclosed in commonly-assigned copending application U.S. Ser. No. 09/822,963, hereby incorporated by reference in its entirety.

The present invention is further illustrated by the following examples of its practice and design.

EXAMPLES

Gelatin granules with iron were prepared by the following procedure. A 20% gelatin solution was made up with lime-processed ossein (LPO) gelatin. The required amount of the iron powder was added while stirring. The required amount of a 2% solution of a chemical crosslinker was added to the gelatin solution. The crosslinker used was bis(vinylsulfonyl) methane. The gelatin-iron mixture was poured into 1 inch thick slabs and chilled to form gels. These gels were then sent through a noodler to produce approximately 5 mm noodles of the gelatin/iron mixture, which were then dried over a few days in an oven set at 50° C. The dried noodles were then crushed in a grinding mill and sieved. Several different variations were made in the formulation. The variables tested included iron particle size, ratio of iron to gelatin, and amount of gelatin crosslinker. The Table 1 below gives a summary of the gelatin/iron granules prepared.

TABLE 1

| Gel granule I.D. | Iron particle size* | $\mu$Moles crosslinker/ gm gelatin | Iron volume fraction % |
|---|---|---|---|
| A1 | 6 $\mu$m | 25.5 | 5.15 |
| A2 | −325 mesh | 25.5 | 5.15 |
| B1 | 6 $\mu$m | 51.0 | 5.15 |
| B2 | −325 mesh | 51.0 | 5.15 |
| C1 | 6 $\mu$m | 102.0 | 5.15 |
| C2 | −325 mesh | 102.0 | 5.15 |
| D1 | 6 $\mu$m | 153.0 | 5.15 |
| D2 | −325 mesh | 153.0 | 5.15 |
| E1 | 6 $\mu$m | 25.5 | 7.5 |
| E2 | −325 mesh | 25.5 | 7.5 |
| F1 | 6 $\mu$m | 51.0 | 7.5 |
| F2 | −325 mesh | 51.0 | 7.5 |
| G1 | 6 $\mu$m | 102.0 | 7.5 |
| G2 | −325 mesh | 102.0 | 7.5 |
| H1 | 6 $\mu$m | 153.0 | 7.5 |
| H2 | −325 mesh | 153.0 | 7.5 |
| I1 | 6 $\mu$m | 25.5 | 14 |
| I2 | −325 mesh | 25.5 | 14 |
| J1 | 6 $\mu$m | 51.0 | 14 |
| J2 | −325 mesh | 51.0 | 14 |
| K1 | 6 $\mu$m | 102.0 | 14 |
| K2 | −325 mesh | 102.0 | 14 |
| L1 | 6 $\mu$m | 153.0 | 14 |
| L2 | −325 mesh | 153.0 | 14 |

*−325 mesh corresponds to about 44 $\mu$m

Example 1

A simulated waste photographic solution was prepared by mixing the following:

(1) 0.51 g silver iodide+11.2 g silver bromide in 286 g of C-41 fixer solution (2) 428 g of C-41 developer solution (3) 286 gm of C-41 bleach solution (4) 1 ml of KODAK PHOTO-FLOW 200 containing biocide and some nonionic surfactant.

The resulting solution has 5502 g/l of silver. The gelatin granules selected for this experiment were A1, A2, D1, D2, I1, I2, L1, L2, described above. Each was sieved to obtain granules between 0.6 and 1.0 mm. Then 37.44 g of the simulated waste solution was taken in each vial and contacted with the granules of each of the gelatin/iron mixtures. The amount of the granules contacted with each solution was such that the iron to silver amount in the vials was fixed at 3.0. The vials were capped and gently rotated to achieve mixing. Samples were taken after 30 minutes of contact and after 5 hours of contact. The silver concentration in the samples were determined using atomic absorption spectroscopy. In order to measure the amount of fluid absorbed by the gel/iron granules, the granules were drained off all fluid after 24 hours of contact and the g of fluid absorbed per g of gel was calculated. Table 2 shows the results.

TABLE 2

| Gel I.D. | Gram of gel/iron granule per vial | Silver conc. after 30 min | Silver conc. after 5 hours | Grams fluid absorbed/ gram gel |
|---|---|---|---|---|
| A1 | 2.56 | 5750 | 4250 | 6.5 |
| A2 | 2.56 | 1470 | 2.0 | 7.75 |
| D1 | 2.56 | 5050 | 4.8 | 2.88 |
| D2 | 2.56 | 2040 | 0.9 | 2.75 |
| I1 | 1.32 | 5250 | 590 | 4.13 |
| I2 | 1.32 | 2720 | 2.1 | 4.05 |
| L1 | 1.32 | 4940 | 1.0 | 1.73 |
| L2 | 1.32 | 2880 | 1.0 | 3.25 |

The formulation differences between the above gelatins include all the three variables: volume fraction of iron, iron particle size, and amount of gelatin crosslinker. As seen from the results above, at long times, most of the gels are effective at reducing the silver concentration in solution. However, at short times (30 min), the major variable that affects kinetics is the iron particle size. The small particles (those with subscript 1) (6 µm) are not as effective as the larger iron particles (those with subscript 2) (−325 mesh or 44 µm). Thus, it is preferred that the iron particle size be greater than 10 µm. The higher iron volume fraction or the gelatin crosslinker level does not have significant effects on the efficacy of silver removal. However, it is seen that the amount of gelatin crosslinker significantly affects the amount of fluid absorbed by the gel. Gels D and L with higher crosslinker have a lower absorbance than A or I. Thus, since the crosslinker level has no significant impact on reaction kinetics, and favorably affects absorbance, a higher crosslinker level is preferred.

Example 2

The kinetics of silver reduction was measured by measuring the change in silver concentration at 0.5 hours and 3.0 hours. Assuming a first order reaction, the reaction rate constant is given by:

$$-\ln\frac{C_A}{C_{Ao}} = kt \quad\quad 1$$

where $C_A$ is the concentration of silver at any time t and $C_{Ao}$ is the silver concentration at the start of the experiment. The reaction rate constant in hour$^{-1}$ is given by $$k = \frac{(t2 - t1)}{\left(\ln\frac{C_{A1}}{C_{Ao}} - \ln\frac{C_{A2}}{C_{Ao}}\right)} \quad\quad 2$$

where t2 is 3 (hours) and t1 is 0.5 (hours). $C_{A1}$ is the concentration of silver at 0.5 hours and $C_{A2}$ is the concentration at 3 hours.

The reaction rate constant per gram of iron, K, is given by the reaction rate divided by the amount of iron (as grams of iron per gram of initial silver in solution). The higher the value of K (reaction rate constant/gram of iron), the more efficacious is the form of iron. Four materials were tested: (1) gelatin/iron granules D2 whose composition is listed in Table 1 above, (2) shredded steel wool sold by ISP, (3) chopped steel wool (ISP), and (4) −200 mesh iron powder (74 µm) which was used to make D2. The steel wool materials are those that are typically used in metal—metal exchange cartridges used in the trade. The experiment was carried out in a similar manner as described in Example 1, except that differing levels of iron to silver were used as shown in Table 3 below. The silver-containing solution was similar to the one used in Example 1. Atomic Absorption Spectroscopy was used to measure the silver concentration. Table 3 shows the results.

TABLE 3

| | Grams iron/gram silver | | | | | | | | | |
|---|---|---|---|---|---|---|---|---|---|---|
| | 0.5 | | 1.125 | | 1.75 | | 2.375 | | 3.0 | |
| Material | 0.5 hr | 3 hr | 0.5 hr | 3 hr | 0.5 hr | 3 hr | 0.5 hr | 3 hr | 0.5 hr | 3 hr |
| D3 | 6400 | 5100 | 5900 | 2200 | 5500 | 260 | 5400 | 10 | 4000 | 4.9 |
| Chopped steel wool | 6900 | 7200 | 6400 | 5900 | 6400 | 4500 | 6400 | 3300 | 5800 | 1600 |
| Shredded steel wool | 7100 | 7300 | NA* | NA | NA | NA | NA | NA | 5300 | 280 |
| −200 mesh iron powder | 6700 | 3800 | NA | NA | NA | NA | NA | NA | 6400 | 2100 |

*NA indicates no test data available.

The reaction rate constant k, and the rate constant divided by the iron weight, K, was calculated from the above data as per the equations given above. The results are tabulated below in Table 4.

TABLE 4

| | | | Grams iron/gm silver | | | | | | | |
|---|---|---|---|---|---|---|---|---|---|---|
| | 0.5 | | 1.125 | | 1.75 | | 2.375 | | 3.0 | |
| Material | k (hr$^{-1}$) | K hr$^{-1}$/gm | K | K | K | K | K | K | K | K |
| D3 | 0.09 | 0.18 | 0.39 | 0.35 | 1.22 | 0.70 | 2.52 | 1.06 | 2.68 | 0.89 |
| Chopped steel wool | −0.02 | −0.03 | 0.03 | 0.03 | 0.14 | 0.08 | 0.26 | 0.11 | 0.52 | 0.17 |
| Shredded steel wool | −0.02 | −0.02 | NA | NA | NA | NA | NA | NA | 1.18 | 0.39 |
| −200 mesh iron powder | 0.23 | 0.45 | NA | NA | NA | NA | NA | NA | 0.45 | 0.15 |

*NA indicates no test data available.

As seen from the above results, the value of K (rate constant divided by g of iron) is the highest for the gelatin/iron matrix, suggesting that the efficacy of iron is higher when present in the gelatin iron matrix. By matching values of K for the gelatin granules and the chopped or shredded steel wool, it is possible to state that in order to match a given desired kinetics for silver reduction, one would have to use much less iron if one were to use the iron gelatin granules.

Example 3

A gelatin iron granule formulation was made in a similar manner as described in Example 1 above. A −200 mesh (74 $\mu$m) iron powder was used to make the granule. The crosslinker level was 102 $\mu$mole/g of gelatin. The volume fraction of iron was 7.5%. The dried noodles, as per the procedure of Example 1, was ground and sieved in a set of sieve trays to collect gelatin/iron granules of different sizes. The silver containing solution used in this test had a silver concentration of 3.515 gm/L. Then 0.25 g of the granules in each size class was contacted with 19.75 g of solution at a ratio of iron to silver of 1.2 g/g. The experimental procedure was carried out in a similar manner as described in Example 1. The times of sample collection were 0.25, 0.5, 1, 2, and 4 hours. The silver ion content in these solutions were measured using a KODAK Colorimetric Silver Test kit (Cat. #896 9982), which has an accuracy to detect as low as 60 mg/l of silver. The silver concentration data obtained are shown in Table 5 below.

TABLE 5

| Hours | Size (mm) | | | |
|---|---|---|---|---|
| → | >>1.7 mm | 1.7–1.4 mm | 1.4–1.0 mm | 1.0–0.6 mm |
| 0 | 3515.3 | 3515.3 | 3515.3 | 3515.3 |
| 0.25 | 3240.2 | 3214.6 | 2657.9 | 2871.1 |
| 0.5 | 3341.5 | 2935.1 | 2698.4 | 2308.0 |
| 1 | 2960.7 | 2452.0 | 2196.0 | 1712.9 |
| 2 | 2560.8 | 2048.8 | 1610.5 | 1108.2 |
| 4 | 1429.2 | 1402.5 | 941.8 | 657.3 |

The data obtained above was used to calculate k, the reaction rate constant described in the equation 1 in Example 2. This was done using regression analysis. The results are shown in Table 6 below:

TABLE 6

| Size | k |
|---|---|
| >>1.7 mm | 0.225 |
| 1.7–1.4 mm | 0.214 |
| 1.4–1.0 mm | 0.288 |
| 1.0–0.6 mm | 0.379 |

As seen in the table the reaction rate constant drops when the gelatin/iron granule size becomes bigger than 1.0 mm. Thus, it is preferred that the granules be as small as possible.

Example 4

Gelatin solutions containing dispersed iron particles were coated onto a polyethylene terephthalate support having a thickness of 7 mil (thousandths of an inch). The coatings were made by depositing a puddle of the gelatin/iron dispersion and dragging a knife blade with a 0.025 inch gap across the length of the support. Coatings were made on both sides of the support to minimize the curling of the support. The coatings were allowed to set and then dried at ambient conditions. A polymeric viscosifier was added to the coating solution, to minimize settling of the iron particles. The viscosifier used was sodium poly (2-acrylamido-2-methylpropane sulfonate). It was used at a level of 5% with respect of the gelatin in the solution. After the coatings were prepared, the amount of material deposited, was determined by cutting out a 50×35 mm rectangle and measuring the weight of the coated punch versus a bare support of the same dimension. One or more of these cutouts were placed in a vial with 20 ml of a silver bearing solution at a concentration of 2870 mg/l. The ratio of iron to silver in these vials was between 3 and 5. The vials were gently rotated for 24 hours. The solutions were removed and measured for silver using atomic absorption spectroscopy. Table 6 below gives the description of the coatings prepared.

TABLE 6

| Coating # | Vol % iron | $\mu$mol/gm hard | Laydown of gel mg/ft$^2$ | Laydown of iron mg/ft$^2$ | Iron/silver in vial | Conc silver > 24 hrs |
|---|---|---|---|---|---|---|
| 1 | 5.15 | 102.04 | 8765.9 | 2922.0 | 2.88 | 440 |
| 2 | 14.00 | 102.04 | 8204.6 | 8204.6 | 5.39 | 5.9 |
| 3 | 32.82 | 102.04 | 5078.3 | 15234.9 | 5.00 | 7.2 |
| 4 | 14.00 | 204.08 | 7769.4 | 7769.4 | 5.10 | 7.3 |
| 5 | 14.00 | 306.12 | 7757.4 | 7757.4 | 5.09 | 7.2 |

As seen from the results in Table 6 above, the coatings containing iron and gelatin are successful at reducing the silver and decreasing the concentration of soluble silver. However, compared to granules, it is seen that higher amounts iron are required per gram of silver to be removed.

The invention has been described in detail with particular reference to certain preferred embodiments thereof, but it will be understood that variations and modifications can be effected within the spirit and scope of the invention.

What is claimed is:

1. A method for recovering silver from a waste photographic processing solution comprising silver ions, which method comprises contacting said solution with a body of material comprising fine particles of iron dispersed in a binder matrix of crosslinked gelatin, wherein the gelatin has a crosslinker at a level from 50 to 250 $\mu$mole/g of gelatin, which iron particles have an average size between 30 $\mu$m and 500 $\mu$m and reduces the silver ions to silver metal.

2. The method of claim 1 wherein the material is in the form of a coating on a substrate.

3. The method of claim 1 where the volume fraction of metal in the total material, including hydrophilic colloid and metal, is from 5 to 35 percent.

4. The method of claim 1 where the body of the material is of the form of granules whose size is less than 5 mm.

5. The method of claim 1 where the body of the material is of the form of granules whose size is less than 1 mm.

6. A method for recovering silver from a waste photographic processing solution comprising silver ions, which method comprises contacting said solution with a body of material comprising fine particles of metal dispersed in a binder matrix of hydrophilic colloid, and wherein the metal has a higher electropositive oxidation potential than silver and reduces the silver ions to silver metal, wherein substantially all of the metal particles furthest from the surface of the matrix are not further than 10 mm from the surface of the matrix and wherein the material is either in the form of a coating on a substrate or in the form of granules.

7. The method of claim 6 wherein substantially all of the metal particles furthest from the surface of the matrix are not further than 5 mm from the surface of the matrix.

8. The method of claim 6 wherein the body of material comprises granules of which more than 90% are capable of passing through a screen with a 10 mm opening.

9. The method of claim 6 wherein the body of material is contained within a canister comprising a housing having ports for the respective intake of the processing solution and the discharge of treated processing solution and wherein the processing solution is a waste solution that flows from a photoprocessor and contacts the body of material for a sufficient time, so as to reduce the silver ion concentration, and subsequently exits the canister substantially silver free.

* * * * *